Figure 1:
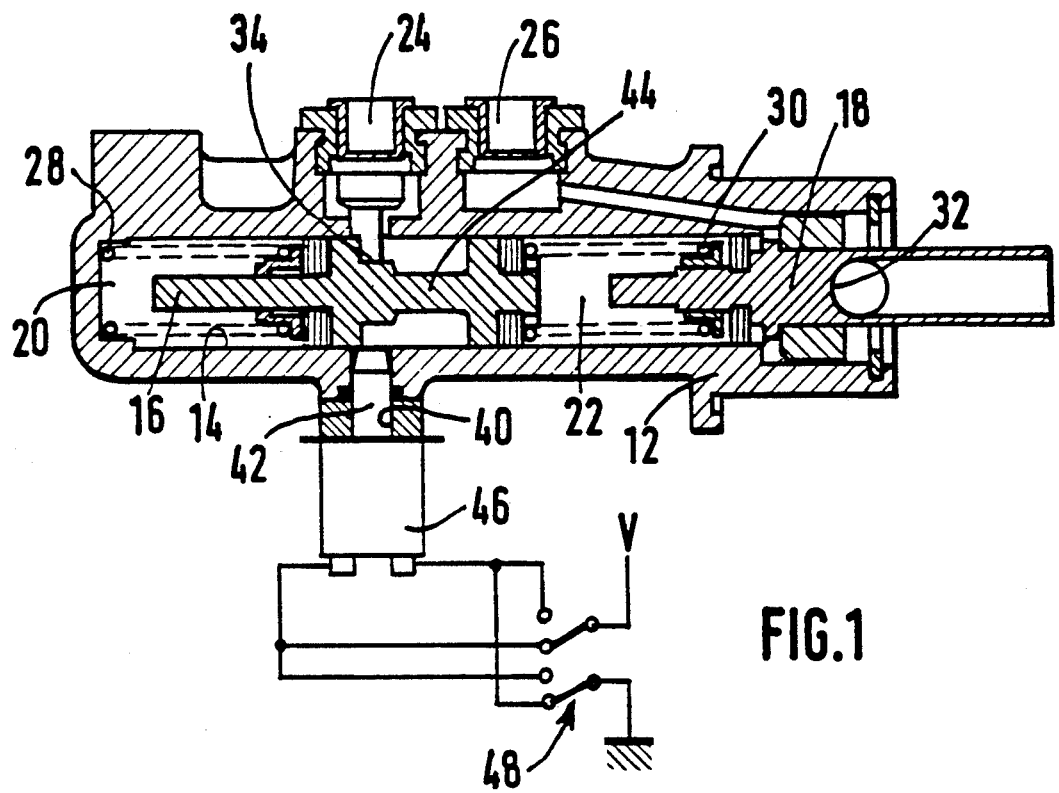

United States Patent

Tribuzio et al.

Patent Number: 5,327,724
Date of Patent: Jul. 12, 1994

[54] LOCKABLE MASTER CYLINDER

[76] Inventors: Pasquale Tribuzio; Vincenzo Manzo, both of Bendix Altecna S.p.A. - Zona Industriale Casella Postale 27, 70026 Modugno (Bari), Italy

[21] Appl. No.: 947,636
[22] Filed: Sep. 21, 1992

[30] Foreign Application Priority Data

Sep. 30, 1991 [IT] Italy .................. 91A000733

[51] Int. Cl.$^5$ .............................. B60T 7/00
[52] U.S. Cl. ................................ 60/568; 60/586; 60/569; 60/588; 303/89; 92/18; 92/23
[58] Field of Search ............... 60/533, 568, 569, 570, 60/586; 303/89; 188/265, 353; 91/42; 92/18, 23

[56] References Cited

U.S. PATENT DOCUMENTS

| 2,106,306 | 1/1938 | McGee | 60/570 |
|---|---|---|---|
| 2,329,743 | 9/1943 | Cameron | 92/23 |
| 2,547,233 | 4/1951 | Seppmann | 60/568 |
| 2,585,837 | 2/1952 | Randol | 91/42 |
| 2,873,579 | 2/1959 | Safford | 188/265 |
| 3,818,804 | 6/1974 | Miller | 92/23 |
| 4,869,562 | 9/1989 | Kaes | 188/353 |
| 4,873,824 | 10/1989 | Cox | 92/18 |
| 5,154,493 | 10/1992 | Futrell et al. | 60/570 |

FOREIGN PATENT DOCUMENTS

| 779359 | 4/1935 | France | 60/570 |
|---|---|---|---|
| 500546 | 11/1954 | Italy | 188/265 |

Primary Examiner—Thomas E. Denion

[57] ABSTRACT

The invention relates to a master cylinder comprising a body (12) comprising a bore (14) in which slides, in leaktight manner, at least one piston (16, 18) movable between a rest position and at least one working position and defining at least one pressure chamber (20, 22) connected to an application fluid system, the piston (18) having a peripheral groove (44). According to the invention, a finger (42) actuated by an external mechanism (46) is capable of entering the groove (44) so as to lock the piston in one of its positions.

9 Claims, 2 Drawing Sheets

LOCKABLE MASTER CYLINDER

The present invention relates to a master cylinder at least some of whose components can be locked in working position.

Such a master cylinder finds its application in particular in the hydraulic braking systems of motor vehicles, for which it is often desirable to keep the brakes applied in certain conditions, either to serve as a parking brake, or to serve as an anti-theft device.

This master cylinder may also, in order then to serve solely as an anti-theft device, constitute a clutch transmitter. However, it will be described below in its application to hydraulic brake systems in a version of tandem type.

From U.S. Pat. No. 4,873,824 a brake locking mechanism is known disposed between the booster and the master cylinder.

Such a mechanism has in particular the disadvantage of increasing very substantially the length of the booster-master cylinder assembly, whereas motor vehicle manufacturers wish, on the contrary, to reduce the size of the components.

The invention therefore has as its object such a lockable master cylinder using the conventional components of the braking system and not having the above-mentioned fault.

The invention therefore relates to a master cylinder comprising a body comprising a bore in which slides, in leaktight manner, at least one piston movable between a rest position and at least one working position and defining at least one pressure chamber connected to an application fluid system, this piston having a peripheral groove.

According to the invention, a finger actuated by an external means is capable of entering the groove in order to lock the piston in one of its positions.

Preferably, the external means is an electric motor and the finger is actuated by the motor, either in translation, in a bore made in the body or in rotation so as to constitute a screw housed in the shaft of the motor and cooperating in leaktight manner with a tapped drilling made in the body.

Figure 2:
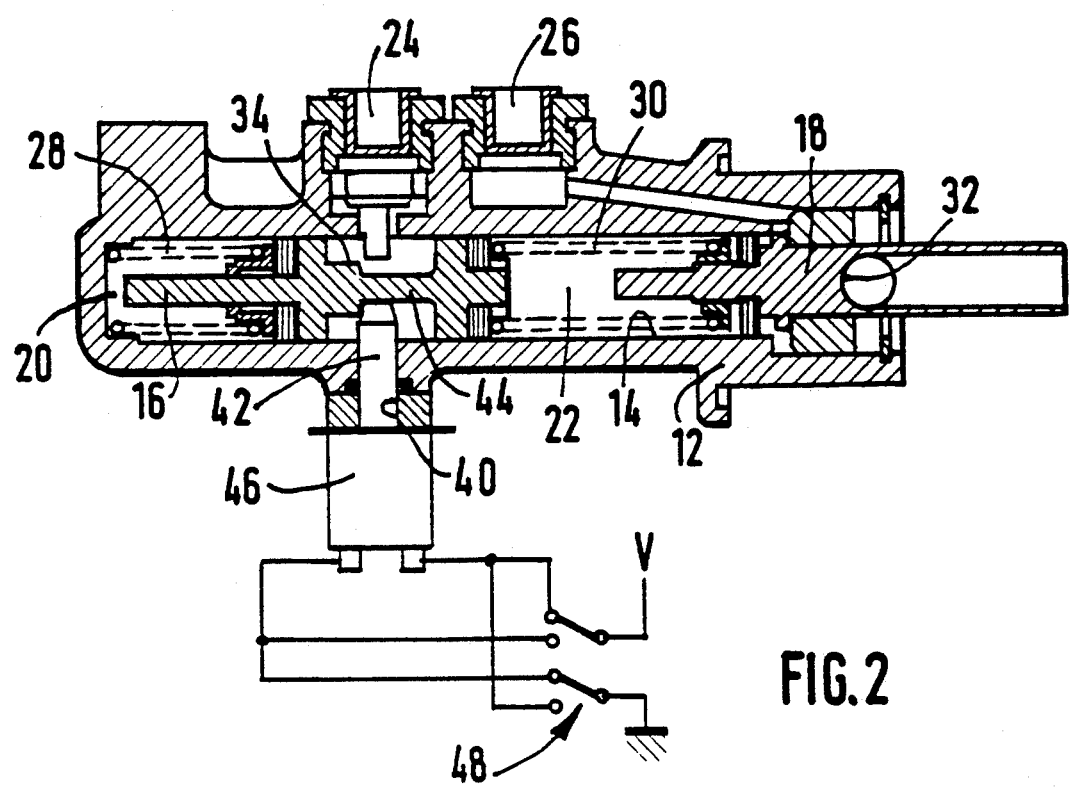
Figure 3:
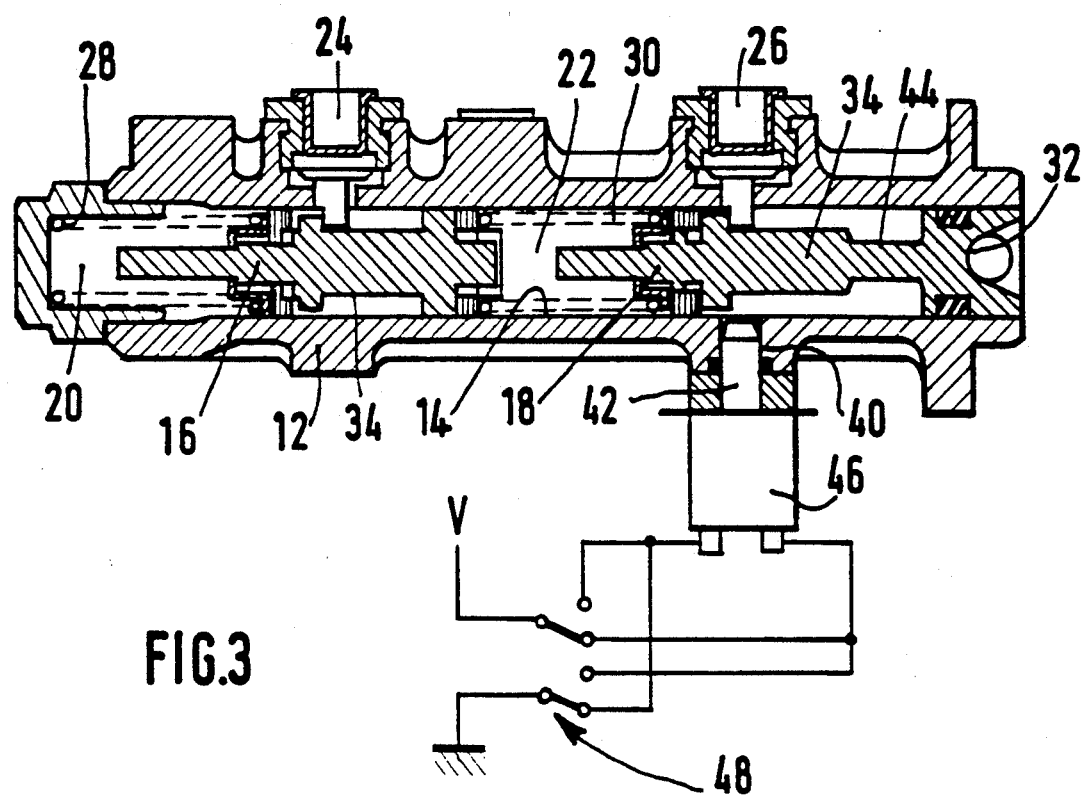
Figure 4:
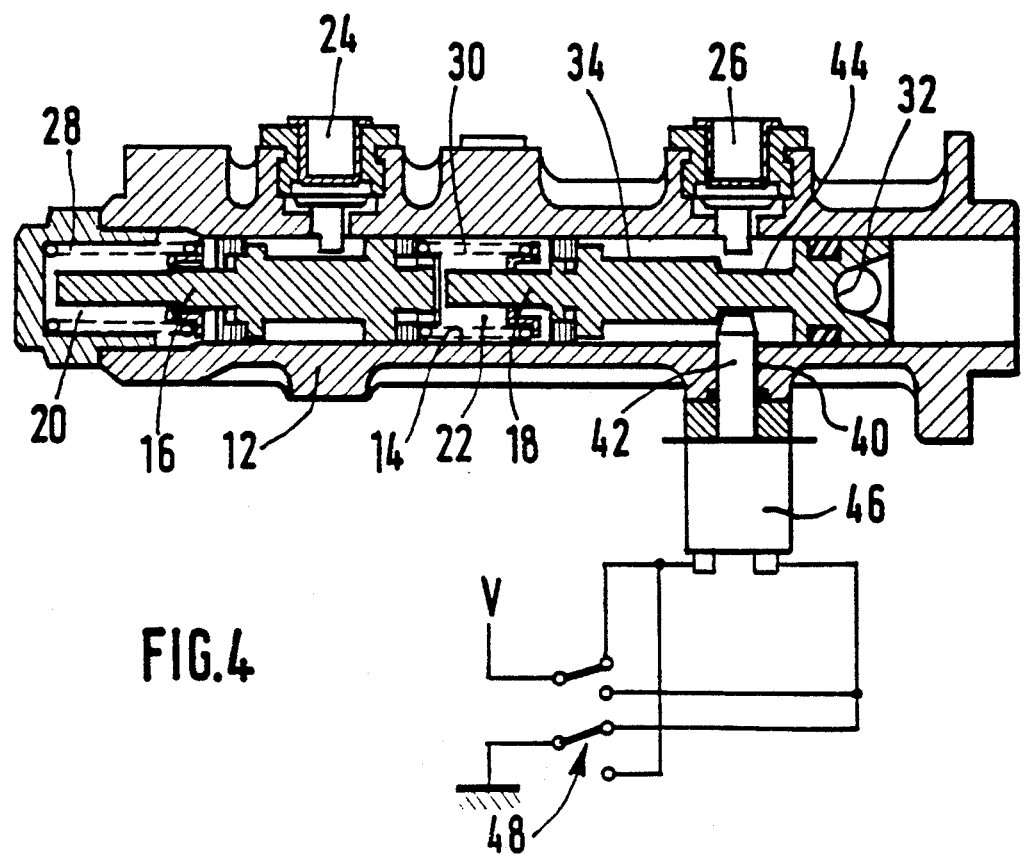

The invention will now be described by way of example with reference to the accompanying drawings in which:

FIGS. 1 and 2 show a tandem master cylinder according to the present invention, respectively in unlocked position and in locked position, tending to keep the brakes of only one of the two hydraulic systems applied, and FIGS. 3 and 4 show another embodiment of the invention, respectively in unlocked position and in locked position, tending to keep the brakes of both hydraulic systems applied.

With reference now to the Figures, a conventional tandem master cylinder is shown constituted by a body 12 in which has been made a blind bore 14. Two pistons 16, 18 slide in this bore 14 and define two pressure chambers 20, 22. These chambers 20, 22 are connected at rest to a reservoir of fluid under low pressure (not shown) by pipes 24, 26, closed as soon as the pistons 16 and 18 move.

The two chambers 20, 22 are also connected respectively to an application hydraulic system, each comprising at least one hydraulic brake actuator, actuated by the pressure created in the chambers 20 and 22 when the pistons 16 and 18 are in their working positions.

Springs 28, 30 bring the equipment to the rest position, whereas the master cylinder is actuated by means of a rod (not shown) bearing against one wall 32 of one 18 of the pistons.

The functioning of the master cylinder proper will not be recapitulated here as it is well known to the person skilled in the art.

According to the invention, a drilling 40 is made in the body 12, for example in an axis perpendicular to the longitudinal axis of the master cylinder.

A finger 42 is disposed in leaktight manner in this drilling 40 and is capable of projecting inside the body 12 of the master cylinder.

The piston 16 (FIGS. 1, 2) or 18 (FIGS. 3, 4) has on its periphery a groove 44, possibly stepped.

In the examples shown, the drilling 40 is a bore and the finger 42 slides in leaktight manner in this bore in the manner of a piston. The drilling 40 may also be tapped and the finger 42 be threaded. An electric motor 46 produces the movement of the finger 42, in translation in the first case or in rotation in the second. The finger 42 may also be constituted directly by the shaft of the electric motor.

An electric reversing switch 48 serves to cause the motor 46 to operate in one direction or in the other. Preferably, an end-of-travel switch will be provided so as to stop the motor at the end of its action.

In the examples also shown, the re-supplying of the pressure chambers 20, 22 with fluid is provided through the intermediary of the groove 34. A simple stepping of this groove 34 may serve as groove 44.

The functioning as parking brake or as anti-theft device is as follows. Before leaving his vehicle, the driver presses on the brake pedal, and this has the effect of moving the pistons 16, 18 into their working positions (towards the left in the Figures). By operating the reversing switch 48, he starts the electric motor 46. The finger 42 then moves and projects into the body until it enters into contact with the piston in the groove 44, then facing the finger 42. The end-of-travel switch then disconnects the electric motor. The driver can release the brake pedal; the piston bearing the groove 44 then remains locked in working position by the finger 42 (as shown in FIGS. 2 and 4). If the groove 44 is constructed in stepped manner, it will easily be understood that the piston bearing the groove 44 remains blocked by the finger 42 in a position which is a function of the step of the groove 44 situated facing the finger 42. The piston will thus be capable of occupying several locked working positions.

In order to unlock the system, the driver must also press again on the brake pedal so as to counteract the force exerted by the piston on the finger 42, and then operate the reversing switch 48 so as to actuate the electric motor 46 in the opposite direction. The finger 42 is then withdrawn so as no longer to project into the body 12.

In one example of an embodiment, a 12 volt, 5 watt direct current motor has been successfully used. When such a master cylinder is used as anti-theft device, it is necessary to provide a key for access to the reversing switch 48, for example electronic, and to prohibit access to the electrical wiring of the motor by some dissuasive means or other.

In the example shown in FIGS. 1 and 2, only the wheels whose brakes are connected to the pressure chamber 20 can be locked in this manner, whereas in the example shown in FIGS. 3 and 4, it is all of the wheels which can be locked.

Although only some embodiments of the invention have been described and shown, it is clear that the person skilled in the art may make many modifications without going beyond the scope of the invention.

In particular, the actuation of the finger 42 in the drilling 40 may be provided by any means external to the master cylinder, such as the electrical control which has just been described, or else by an electro-magnetic control serving to wind up a spring which could cause the finger 42 to enter the body 12 as far as the peripheral groove 44 in order to lock the piston at the time of an attempt to operate the brake.

The invention is also applicable, as an alternative or as a supplement to the embodiment described, to a master cylinder consituting a clutch transmitter, the finger 42 then locking the piston and the clutch which it controls in declutched position.

Similarly, provision may be made to dispose the drilling 40 so that it opens into one of the pressure chambers 20 or 22. The actuation of the electric motor 46 will then cause the finger 42 to enter this chamber, then prohibiting the use of the master cylinder, which will then advantageously constitute in this case a clutch transmitter.

We claim:

1. A master cylinder, comprising a body having a bore in which slides in leaktight manner at least one piston controllable by a control rod and movable between a rest position and at least one working position and defining at least one pressure chamber connected to an application fluid system, said piston having a peripheral groove, the master cylinder including external means for selectively actuating a finger which enters said groove to lock said piston in one of the positions and maintain the one position of the piston when the control rod is in a rest position, the peripheral groove connected to a reservoir of fluid under low pressure and the finger locking said piston in a working position.

2. The master cylinder according to claim 1, wherein said external means is electrically controlled.

3. The master cylinder according to claim 1, wherein said external means is an electric motor and the finger is a screw housed in a shaft of said motor and cooperating in leaktight manner with a drilling at said body.

4. The master cylinder according to claim 1, wherein said external means is an electric motor actuating the finger in translation, the finger sliding in leaktight manner in a bore formed in a drilling at said body.

5. The master cylinder according to claim 4, wherein the finger comprises a shaft of said motor.

6. The master cylinder according to claim 4, wherein said drilling and finger have an axis perpendicular to the longitudinal axis of said master cylinder.

7. The master cylinder according to claim 1, wherein the groove is stepped to provide several lock positions of said piston.

8. The master cylinder according to claim 1, wherein the finger can enter the groove to prevent displacement of the piston from the rest position.

9. The master cylinder according to claim 8, wherein the groove is stepped to provide several working positions of said piston which may be retained in corresponding displaced positions by engagement with the finger.

* * * * *